(12) United States Patent
Iwata

(10) Patent No.: US 10,611,191 B2
(45) Date of Patent: Apr. 7, 2020

(54) TIRE

(71) Applicant: Sumitomo Rubber Industries, Ltd., Kobe-shi, Hyogo (JP)

(72) Inventor: Yasutaka Iwata, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 217 days.

(21) Appl. No.: 15/667,462

(22) Filed: Aug. 2, 2017

(65) Prior Publication Data

US 2018/0056727 A1 Mar. 1, 2018

(30) Foreign Application Priority Data

Aug. 23, 2016 (JP) .................................. 2016-162990

(51) Int. Cl.
*B60C 11/03* (2006.01)
*B60C 11/12* (2006.01)

(52) U.S. Cl.
CPC ...... *B60C 11/0309* (2013.01); *B60C 11/0302* (2013.01); *B60C 11/0332* (2013.01); *B60C 11/12* (2013.01); *B60C 2011/0341* (2013.01); *B60C 2011/0358* (2013.01);
(Continued)

(58) Field of Classification Search
CPC .................. B60C 11/0309; B60C 2011/0337
See application file for complete search history.

(56) References Cited

U.S. PATENT DOCUMENTS 9,969,223 B2* 5/2018 Higashiura ......... B60C 11/0306
2010/0252159 A1* 10/2010 Mukai ................. B60C 11/0302
152/209.25
(Continued)

FOREIGN PATENT DOCUMENTS

EP 2230100 A1 9/2010
EP 2692543 A1 2/2014
(Continued)

OTHER PUBLICATIONS

Extended European Search Report, dated Feb. 2, 2018, for European Application No. 17180678.9.

*Primary Examiner* — Robert C Dye
*Assistant Examiner* — Farah Taufiq
(74) *Attorney, Agent, or Firm* — Birch, Stewart, Kolasch & Birch, LLP

(57) ABSTRACT

A tire comprises a tread portion comprising a first tread portion defined between a tire equator C and a first tread edge. The first tread portion is provided with a crown main groove extending continuously and straight in a tire circumferential direction on a side of the tire equator C and oblique main grooves extending from the first tread edge toward the tire equator C to cross the crown main groove to form oblique land regions each defined between adjacent oblique main grooves. At least one oblique land region is provided with an inner oblique sub-groove extending from the oblique main groove and terminating within the oblique land region on an axially outer side of the crown main groove and an outer oblique sub-groove connecting between the oblique main grooves adjacent to both sides of the oblique land region on the axially outer side of the inner oblique sub-groove.

19 Claims, 5 Drawing Sheets

(52) U.S. Cl.
CPC ............. *B60C 2011/0374* (2013.01); *B60C 2011/0376* (2013.01); *B60C 2011/0381* (2013.01)

(56) References Cited

U.S. PATENT DOCUMENTS

| | | | |
|---|---|---|---|
| 2013/0146192 A1* | 6/2013 | Miyoshi | B60C 11/0302 |
| | | | 152/209.25 |
| 2014/0014244 A1* | 1/2014 | Takano | B60C 11/1315 |
| | | | 152/209.8 |
| 2014/0020803 A1* | 1/2014 | Fujita | B60C 11/03 |
| | | | 152/209.18 |
| 2016/0152091 A1 | 6/2016 | Yoshida | |
| 2016/0318350 A1* | 11/2016 | Matsumoto | B60C 11/032 |

FOREIGN PATENT DOCUMENTS

| | | | | |
|---|---|---|---|---|
| EP | 3075572 A | 10/2016 | | |
| JP | 2013-136333 A | 7/2013 | | |
| WO | WO-2015005291 A1 * | 1/2015 | ............. | B60C 11/11 |

* cited by examiner

TIRE

TECHNICAL FIELD

The present invention relates to a tire capable of exerting excellent on-snow performance.

BACKGROUND ART

For example, Japanese unexamined Patent Application Publication No. 2013-136333 (Patent Literature 1) has proposed a winter tire provided with a crown main groove extending continuously and straight in a tire circumferential direction and a plurality of oblique main grooves crossing the crown main groove.

However, the tire disclosed in Patent Literature 1 has room for further improvement as to the on-snow performance.

SUMMARY OF THE INVENTION

The present invention was made in view of the above, and a primary object thereof is to provide a tire capable of exerting excellent on-snow performance by improving arrangement of grooves.

In one aspect of the present invention, a tire comprises a tread portion comprising a first tread portion defined between a tire equator C and a first tread edge. The first tread portion is provided with a crown main groove extending continuously and straight in a tire circumferential direction on a side of the tire equator C and a plurality of oblique main grooves extending obliquely from the first tread edge toward the tire equator C to cross the crown main groove to form a plurality of oblique land regions each defined between a pair of oblique main grooves adjacent in the tire circumferential direction. And at least one of the oblique land regions is provided with an inner oblique sub-groove extending from one of the oblique main grooves and terminating within the at least one of the oblique land regions on an outer side of the crown main groove in a tire axial direction and an outer oblique sub-groove disposed on the outer side of the inner oblique sub-groove in the tire axial direction and connecting between a pair of the oblique main grooves adjacent to both sides of the at least one of the oblique land regions.

In another aspect of the invention, it is preferred that the inner oblique sub-groove is inclined to an opposite direction to the oblique main grooves.

In another aspect of the invention, it is preferred that the outer oblique sub-groove is inclined to the opposite direction to the oblique main grooves.

In another aspect of the invention, it is preferred that the outer oblique sub-groove is inclined with respect to the tire circumferential direction at an angle smaller than the inner oblique sub-groove.

In another aspect of the invention, it is preferred that the oblique main grooves has groove widths larger than that of the crown main groove at least in a region on the outer side of the crown main groove in the tire axial direction.

In another aspect of the invention, it is preferred that a distance in the tire axial direction between the tire equator and a groove center line of the crown main groove is in a range of from 0.10 to 0.20 times a tread width.

In another aspect of the invention, it is preferred that an angle between the crown main groove and the oblique main grooves is in a range of from 30 to 60 degrees.

DESCRIPTION OF THE PREFERRED EMBODIMENT

An embodiment of the present invention will now be described in conjunction with accompanying drawings.

Figure 1:
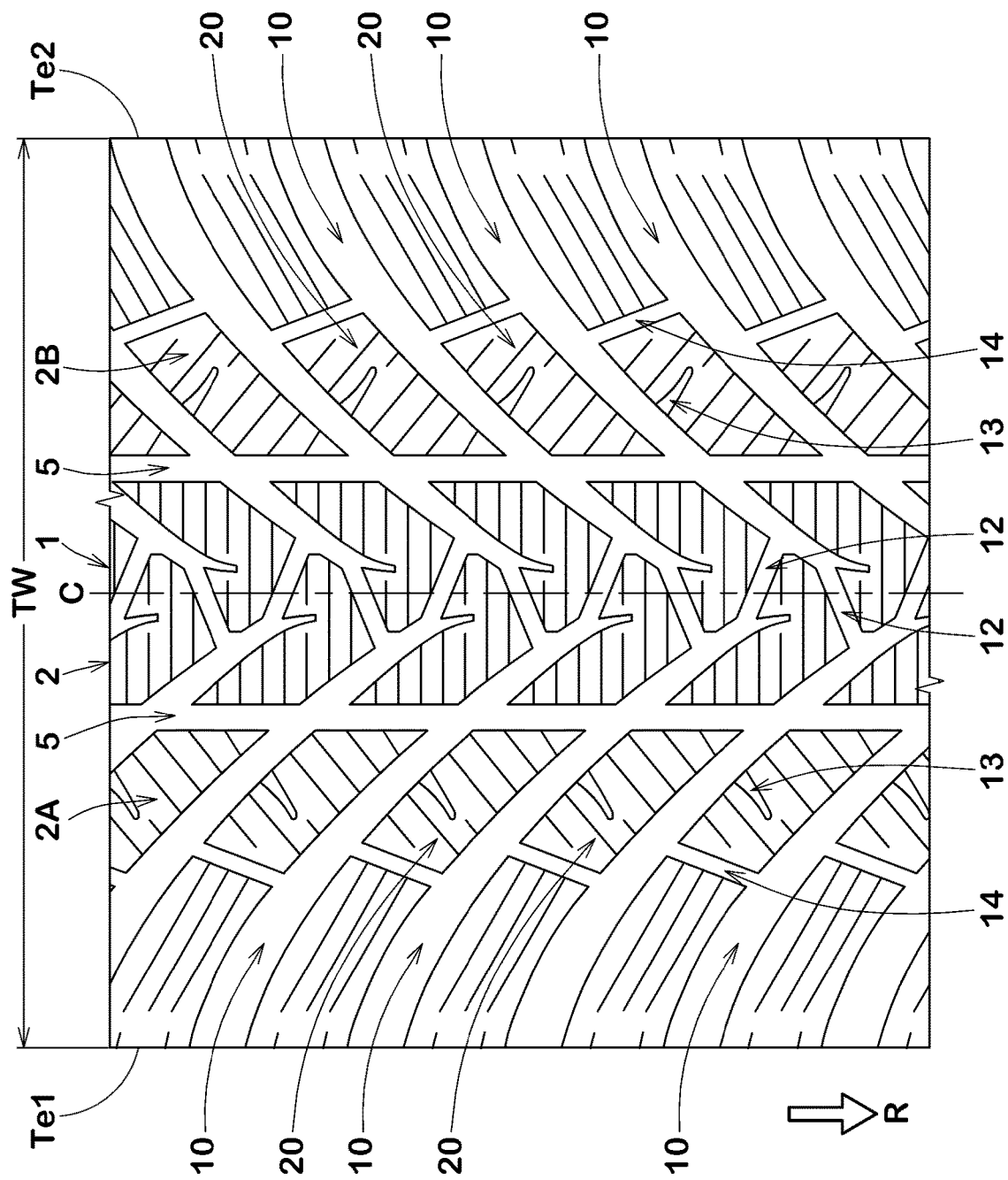
FIG. 1 is a development view of a tread portion of a tire as an embodiment of the present invention.

FIG. 1 is a development view of a tread portion 2 of a tire 1 in this embodiment. The tire 1 in this embodiment is suitably used as a winter tire for a passenger car, for example. Further, the tire 1 in this embodiment is provided with a directional pattern in which a rotational direction R is specified. The rotational direction R is indicated on a sidewall portion (not shown) by characters or symbols, for example.

As shown in FIG. 1, the tread portion 2 of the tire 1 in this embodiment includes a first tread portion 2A defined between the tire equator C and a first tread edge Te1, and a second tread portion 2B defined between the tire equator C and a second tread edge Te2.

The first tread edge Te1 and the second tread edge Te2 are the outermost ground contacting positions of the tire 1 in a tire axial direction when the tire 1 in a standard state is in contact with a flat surface with zero camber angle by being loaded with a standard load. The standard state is a state in which the tire is mounted on a standard rim and inflated to a standard pressure with no tire load. Sizes and the like of various parts of the tire in this specification are those measured in the standard state unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

Each of the first tread portion 2A and the second tread portion 2B is provided with a crown main groove 5, a plurality of oblique main grooves 10, and oblique land regions 20 each defined between a pair of the oblique main grooves 10 adjacent in the tire circumferential direction. The first tread portion 2A and the second tread portion 2B have substantially the same configuration. Hereinafter, the configurations of the crown main groove 5, the oblique main grooves 10 and the oblique land regions 20 provided in the first tread portion 2A will be described, and the description of those provided in the second tread portion 2B will be omitted.

Figure 2:
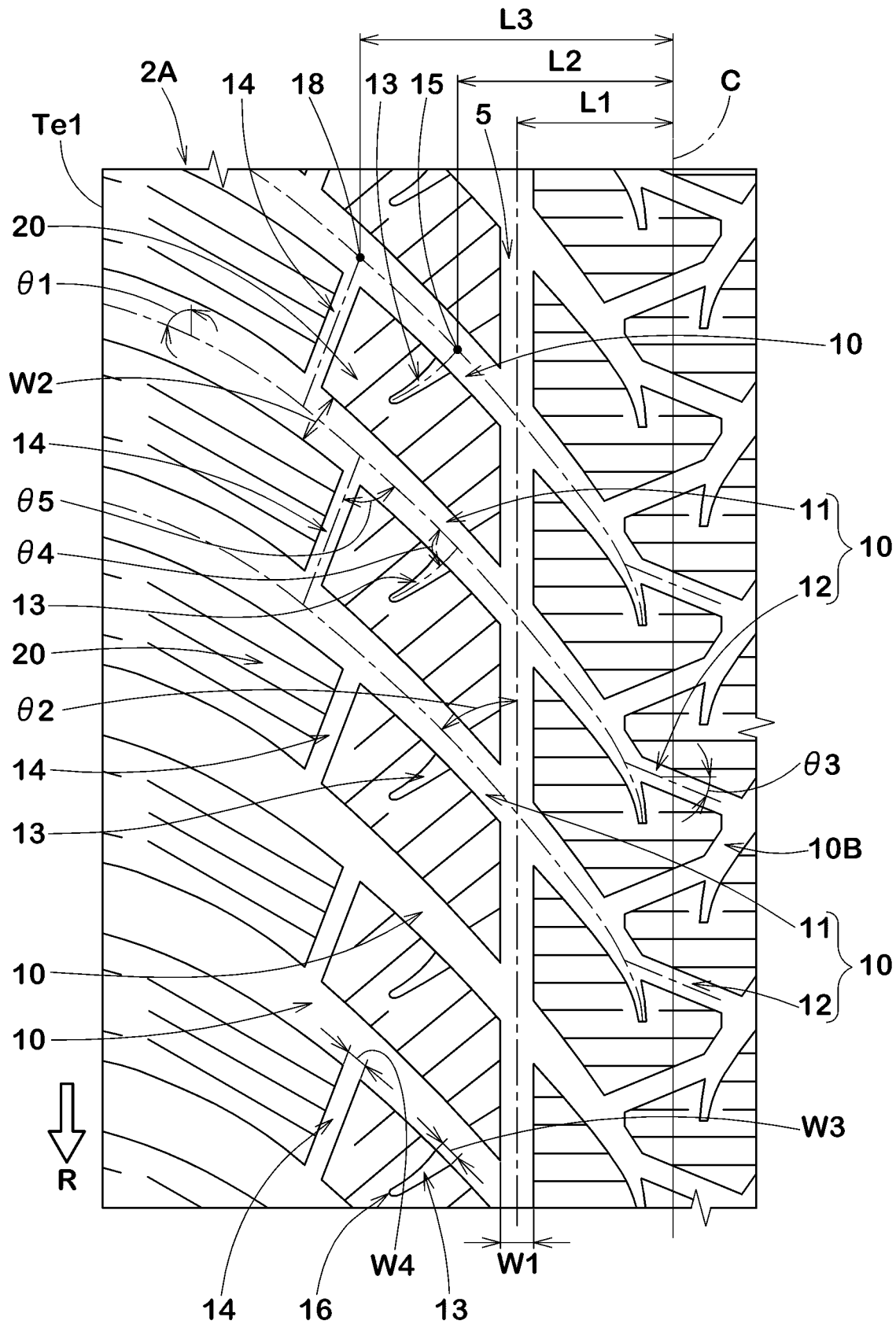
FIG. 2 is an enlarged view of a first tread portion of FIG. 1.

FIG. 2 is an enlarged view of the first tread portion 2A. As shown in FIG. 2, the crown main groove 5 extends straight on a side of the tire equator C. The crown main groove 5 in this embodiment is provided, for example, on the side of the tire equator C of a center position in the tire axial direction between the tire equator C and the first tread edge Te1.

Specifically, it is preferred that a distance L1 between the tire equator C and a groove center line of the crown main groove 5 is, for example, in a range of from 0.10 to 0.20 times a tread width TW (shown in FIG. 1 and the same hereinafter). The tread width TW is a distance in the tire axial direction between the first tread edge Te1 and the second tread edge Te2 when the tire is in the standard state.

It is preferred that a groove width W1 of the crown main groove 5 is in a range of from 1.5% to 4.5% of the tread width TW, for example.

The crown main groove 5 configured as such can form a long snow block extending in the tire circumferential direction when running on a snowy road and consequently large snow shearing force in the tire axial direction can be obtained.

The oblique main grooves 10 extend obliquely from the first tread edge Te1 toward the tire equator C to cross the crown main groove 5. The oblique main grooves 10 form long snow blocks extending obliquely with respect to the tire axial direction and then shear the snow blocks when running on a snowy road, therefore, it is possible that large traction is obtained.

Each of the oblique main grooves 10 in this embodiment includes, for example, a main body portion 11 extending from the first tread edge Te1 to an area between the crown main groove 5 and the tire equator C, and an inner portion 12 connected with the main body portion 11 on the side of the tire equator C.

Each of the main body portions 11, for example, extends from the first tread edge Te1 toward the tire equator C with a gradually decreasing angle θ1 with respect to the tire circumferential direction. It is preferred that the angle θ1 of the main body portions 11 is in a range of from 15 to 75 degrees, for example. The main body portions 11 configured as such exert shearing force in the tire axial direction as well, therefore, it is useful for improving cornering performance on a snowy road.

An angle θ2 between the crown main groove 5 and the main body portions 11 of the oblique main grooves 10 is preferably not less than 30 degrees, more preferably not less than 40 degrees, and preferably not greater than 60 degrees, more preferably not greater than 50 degrees. The main body portions 11 configured as such can exert the above-mentioned effects without impairing drainage performance of the crown main groove 5 during running on a wet road surface.

It is preferred that the main body portions 11 are configured so that, for example, groove widths W2 thereof gradually decreases axially inwardly. It is preferred that the groove widths W2 of the main body portions 11 is in a range of from 2% to 7% of the tread width TW, for example. The main body portions 11 configured as such are useful for improving the on-snow performance and wet performance while maintaining steering stability on a dry road surface.

In order to further improve the on-snow performance and the wet performance, it is preferred that the main body portions 11 have the groove widths larger than the groove widths of the crown main grooves 5 at least in a region on an outer side of the crown main grooves 5 in the tire axial direction.

Each of the inner portion 12 is connected with one of the main body portions 11 on a toe-side in the rotational direction R (hereinafter may be simply referred to as "toe-side") of an end of the main body portion 11. In other words, the inner portions 12 diverge from the main body portions 11 to extend toward the tire equator C.

The inner portions 12 extend straight and obliquely in a same direction as the main body portions 11, for example. Each of the inner portions 12 crosses the tire equator C, for example, to be connected with one of oblique main grooves 10B provided in the second tread portion 2B. Generally speaking, large ground contact pressure is applied to the tire on an area around the tire equator C during running, therefore, the inner portions 12 can strongly compress the snow, thereby, it is possible that excellent on-snow traction is exerted.

In order to exert the shearing force in the tire axial direction as well, it is preferred that an angle θ3 of the inner portions 12 with respect to the tire axial direction is in a range of from 10 to 30 degrees, for example.

At least one of the oblique land regions 20 is provided with an inner oblique sub-groove 13 extending from one of the oblique main grooves 10 adjacent to the at least one of the oblique land regions 20 and terminating within the oblique land region 20 on the axially outside of the crown main groove 5, and an outer oblique sub-groove 14 crossing the oblique land region 20 on the axially outside of the inner oblique sub-groove 13. Each of the oblique land regions 20 in this embodiment is provided with the inner oblique sub-groove 13 and the outer oblique sub-groove.

Generally, when running on a snowy road, the snow that has entered the oblique main grooves 10 tends to be compressed while moving to each of the sub-grooves. Each of the inner oblique sub-groove 13 and the outer oblique sub-groove 14 of the present invention compresses and then shears the snow entering from the oblique main grooves 10, therefore, it is possible that the on-snow performance is further improved. Further, in general, a larger ground contact pressure is applied to the inner oblique sub-grooves 13, which are disposed on the axially inside, than to the outer oblique sub-grooves 14. However, the inner oblique sub-grooves 13 of the present invention terminates within the oblique land regions 20, therefore, it is possible that the snow moved from the oblique main grooves 10 is compressed harder when running on a snowy road, and consequently large shearing force is obtained.

Moreover, the outer oblique sub-grooves 14 crossing the oblique land region 20 are provided axially outside the inner oblique sub-grooves 13, therefore, land region pieces provided with the inner oblique sub-grooves 13 are each surrounded by the crown main groove 5, the oblique main grooves 10, and the outer oblique sub-groove 14. Thereby, it is possible that the land region pieces can be appropriately deformed when running on a snowy road, and consequently it is possible that clogging of snow in the inner oblique sub-groove 13 is suppressed.

Each of the inner oblique sub-grooves 13, for example, is connected with one of the oblique main grooves 10 adjacent on the toe-side to the oblique land region 20 and extends obliquely toward the first tread edge Te1 to a heel-side in the rotational direction R (hereinafter may be simply referred to as "heel-side"). In other words, the inner oblique sub-grooves 13 are inclined to an opposite direction to the oblique main grooves 10. As a preferred embodiment, the inner oblique sub-grooves 13 in this embodiment are smoothly curved.

An angle θ4 of the inner oblique sub-grooves 13 with respect to the oblique main grooves 10 is preferably not less than 70 degrees, more preferably not less than 75 degrees, and preferably not greater than 90 degrees, more preferably not greater than 85 degrees. Thereby, it is possible that the on-snow performance is improved while uneven wear of the land region pieces provided with the inner oblique sub-grooves 13 is suppressed.

In order to improve the on-snow performance while suppressing uneven wear of the oblique land regions 20, it is preferred that a distance L2 in the tire axial direction between the tire equator C and an intersection 15 of an extended groove center line of one of the inner oblique sub-groove 13 and a groove center line of one of the oblique main groove 10 is in a range of from 0.15 to 0.25 times the tread width TW, for example.

It is preferred that groove widths W3 of the inner oblique sub-grooves 13 gradually decrease toward end portions 16 which terminate within the oblique land regions 20, for example. Thereby, during running on a snowy road, the snow in the inner oblique sub-grooves 13 is likely to be discharged as the oblique land regions 20 are deformed. It is preferred that the groove widths W3 of the inner oblique sub-grooves 13 are in a range of from 1% to 3% of the tread width TW, for example.

It is preferred that each of the outer oblique sub-grooves 14 is inclined to the tire equator C, for example, connecting between the oblique main grooves 10 adjacent on the heel-side and on the toe-side. In other words, the outer oblique sub-grooves 14 are inclined to the opposite direction to the oblique main grooves 10.

An angle θ5 of the outer oblique sub-grooves 14 with respect to the oblique main grooves 10 is preferably not less than 60 degrees, more preferably not less than 65 degrees, and preferably not greater than 80 degrees, more preferably not greater than 75 degrees. The outer oblique sub-grooves 14 configured as such can form snow blocks extending in a direction different from that of the oblique main grooves 10 while suppressing the uneven wear of the oblique land regions 20, and consequently it is possible that the cornering performance on the snow is improved.

As a further preferred embodiment, the outer oblique sub-grooves 14 in this embodiment are inclined at an angle smaller than the inner oblique sub-grooves 13 with respect to the tire circumferential direction. Thereby, when running on a snowy road, the outer oblique sub-grooves 14 and the inner oblique sub-grooves 13 exert the shearing force in different directions, and consequently the on-snow performance is improved.

It is preferred that a distance L3 in the tire axial direction between the tire equator C and an intersection 18 of an extended groove center line of one of the outer oblique sub-grooves 14 and the groove center line of one of the oblique main grooves 10 provided on the toe-side thereof is in a range of from 0.20 to 0.30 times the tread width TW, for example. Thereby, the on-snow performance is improved while the uneven wear of the oblique land regions 20 is suppressed.

It is preferred that the outer oblique sub-grooves 14 in this embodiment extend straight with constant groove widths W4, for example. It is preferred that the groove widths W4 of the outer oblique sub-grooves 14 are in a range of from 1% to 3% of the tread width TW, for example. Thereby, clogging of snow in the outer oblique sub-grooves 14 is suppressed.

Figure 3:
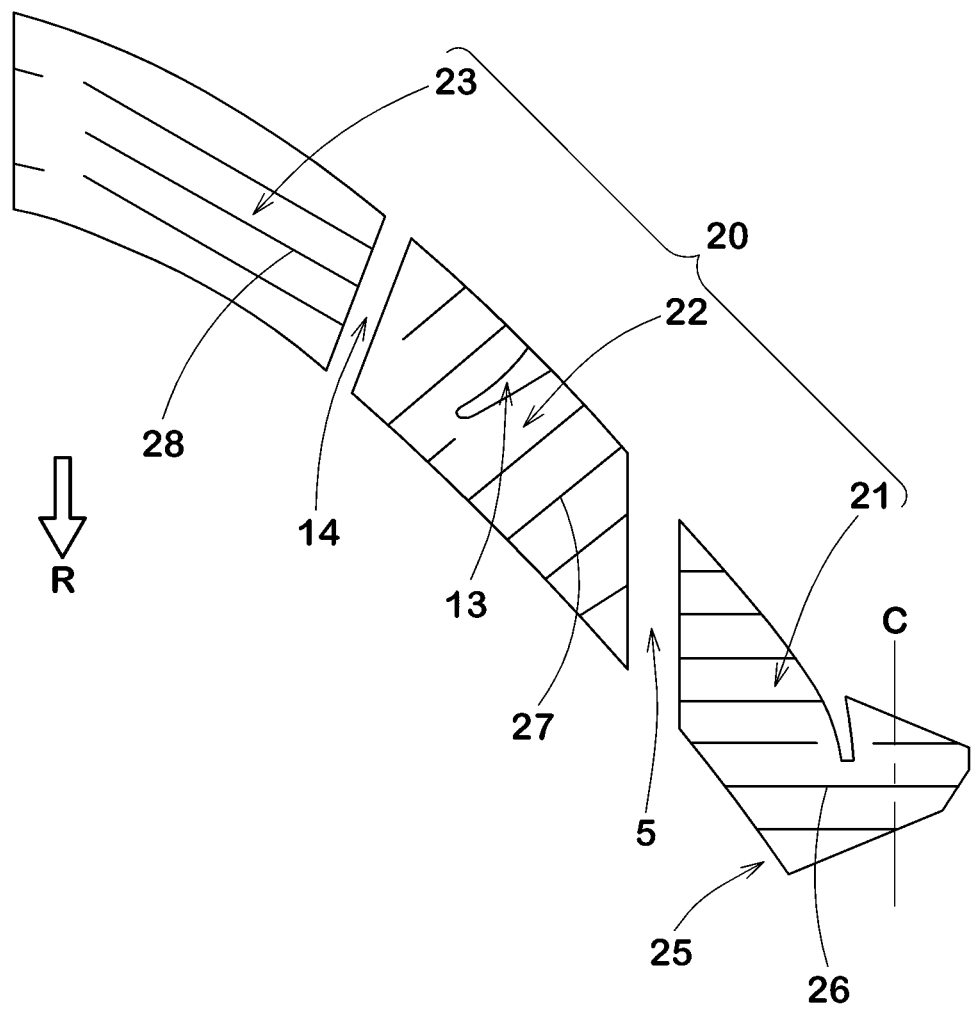
FIG. 3 is a partial enlarged view of an oblique land region of FIG. 2.

FIG. 3 is an enlarged view of one of the oblique land regions 20. As shown in FIG. 3, each of the oblique land regions 20 is divided into a crown block 21, a middle block 22, and a shoulder block 23 by the crown main groove 5 and the outer oblique sub-groove 14 described above.

The crown blocks 21 is provided on the axially inside of the crown main groove 5 and extends beyond the tire equator C, for example.

It is preferred that the crown blocks 21 in this embodiment each have a tip portion 25 convex toward the heel-side in the rotational direction R, for example. It is preferred that each of the tip portions 25 in this embodiment has a V-shaped edge convex toward the heel-side, with the tip portions 25 configured as such, the edges thereof stick into the road surface when running on ice, for example, therefore, large reaction force is obtained.

It is preferred that each of the crown blocks 21 is provided with a plurality of crown sipes 26 extending along the tire axial direction. The crown sipes 26 configured as such can provide large traction when running on ice.

The middle blocks 22 are provided between the crown main groove 5 and the outer oblique sub-grooves 14. Each of the middle blocks 22 is formed substantially in a rectangular shape, for example, except that one of the inner oblique sub-grooves 13 is formed therein. The middle blocks 22 in this embodiment are each formed in a horizontally elongated shape along a longitudinal direction of the oblique main grooves 10, for example. The middle blocks 22 configured as such deform moderately in the tire circumferential direction when running on a snowy road, therefore, it helps to discharge the snow in the oblique main grooves 10.

It is preferred that each of the middle blocks 22 is provided with middle sipes 27 inclined to the opposite direction to the oblique main grooves 10, for example. The middle sipes 27 configured as such can exert frictional force in many directions during running on ice.

The shoulder blocks 23 are provided between the outer oblique sub-grooves 14 and the first tread edge Te1. Each of the shoulder blocks 23 is formed in a horizontally elongated rectangular shape along the longitudinal direction of the oblique main grooves 10, for example.

It is preferred that each of the shoulder blocks 23 is provided with shoulder sipes 28 inclined to a same direction as the oblique main grooves 10, for example. The shoulder sipes 28 configured as such makes rigidity of the shoulder blocks 23 moderate, therefore, it is possible that excellent wandering performance is exerted.

While detailed description has been made of the tire as an embodiment of the present invention, the present invention can be embodied in various forms without being limited to the illustrated embodiment.

Working Example (Example)

Figure 4:
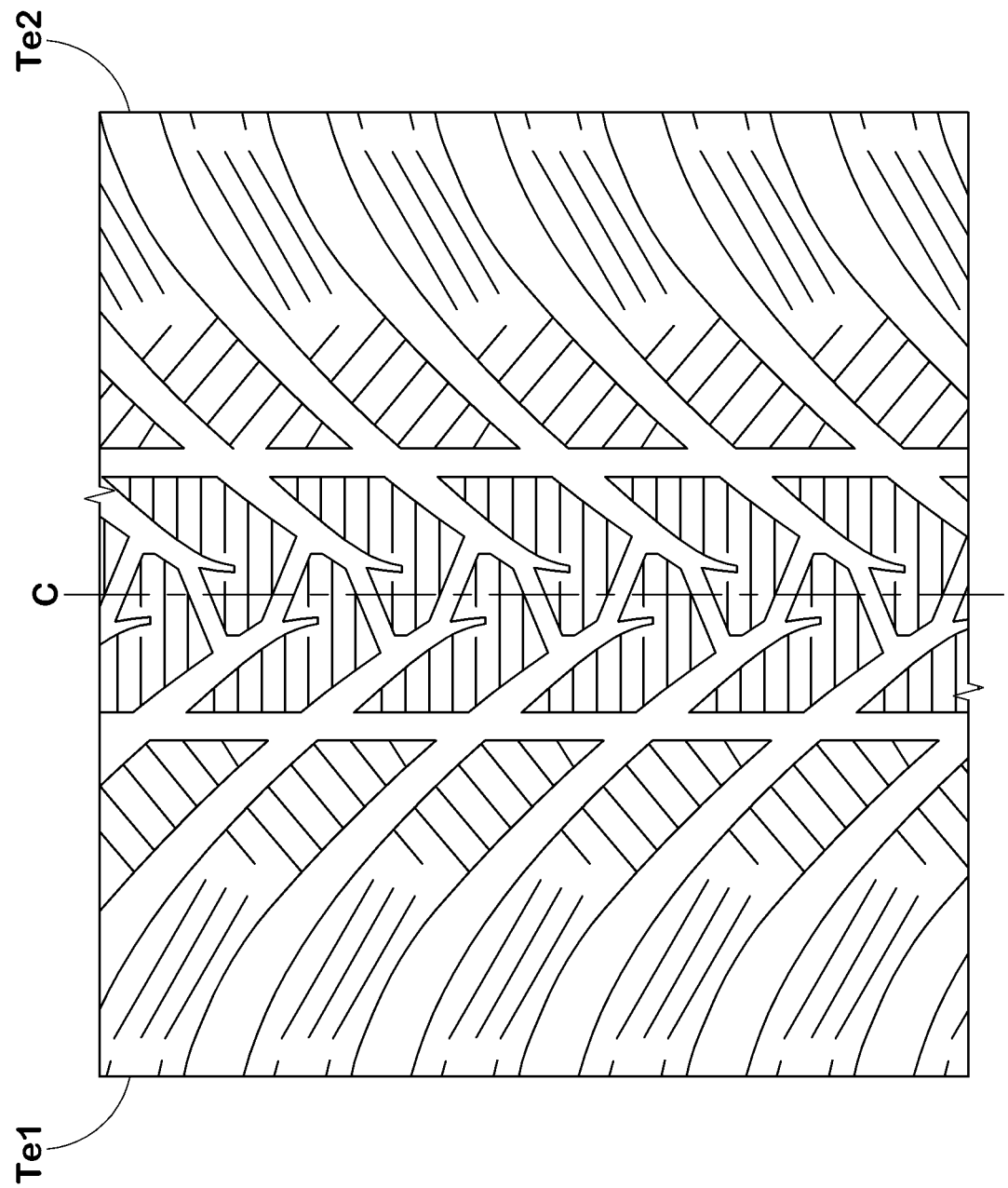
FIG. 4 is a development view of the tread portion of a tire as reference 1.
Figure 5:
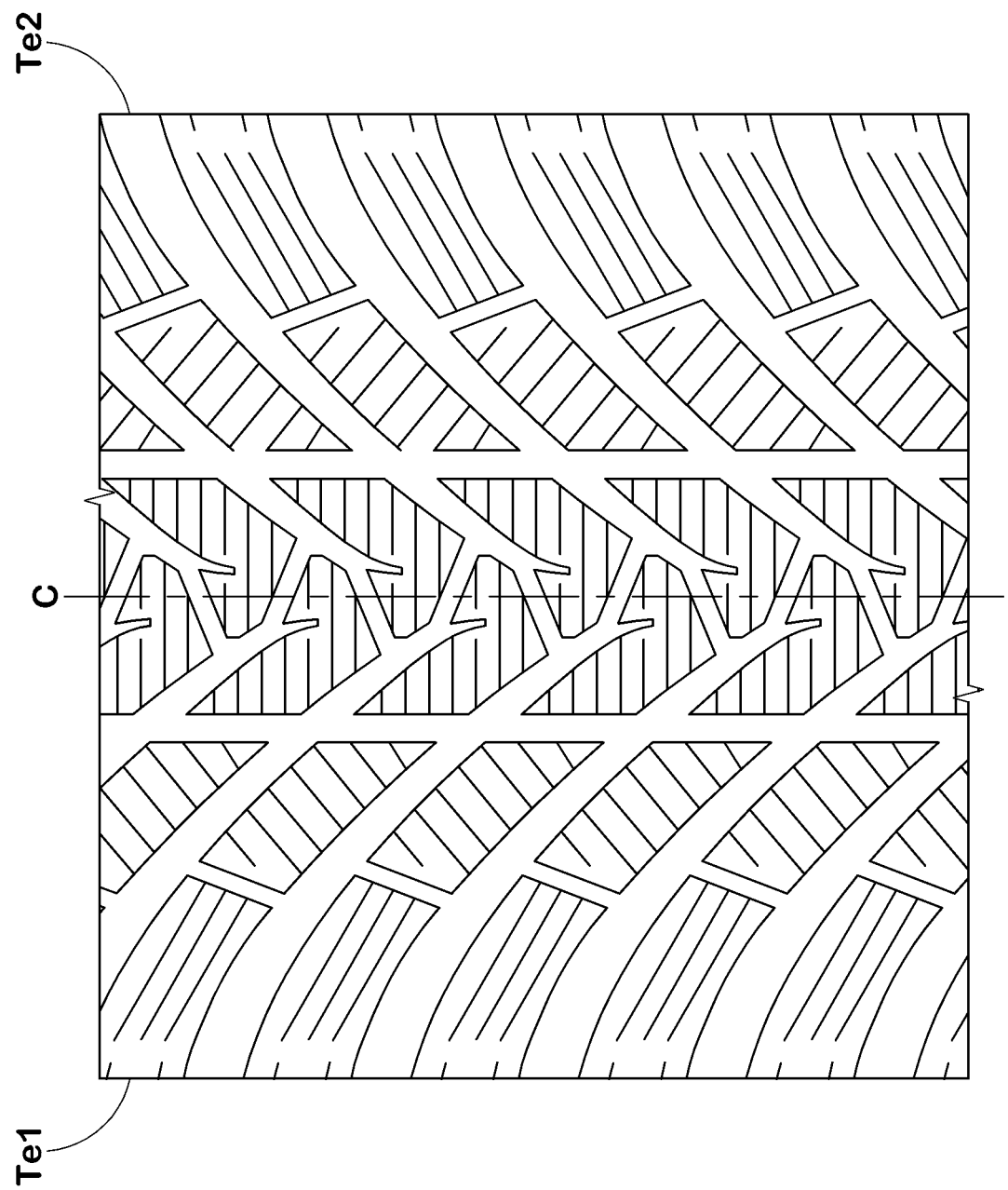
FIG. 5 is a development view of the tread portion of a tire as reference 2.

Tires of size 255/55R18 having a basic tread pattern shown in FIG. 1 were made by way of test according to the specification listed in Table 1. As Reference 1, as shown in FIG. 4, a tire not provided with the inner oblique sub-grooves and the outer oblique sub-grooves was made by way of test. As Reference 2, as shown in FIG. 5, a tire provided with the outer oblique sub-grooves but not provided with the inner oblique sub-grooves was made by way of test. The on-snow performance, the wet performance, and anti-wear performance were tested for each of the test tires. Common specifications of the test tires and the test methods are as follows.

Rim: 18×8.0J

Tire pressure: 230 kPa (front wheels), 250 kPa (rear wheels)

Test car: 4WD car with displacement of 3000 cc

<On-Snow Performance>

A distance needed for accelerating the above test car from 5 km/h to 20 km/h on a snowy road was measured by GPS and an average acceleration was calculated. The results are indicated by an index based on the average acceleration of the Reference 1 being 100, wherein the larger the numerical value, the better the on-snow performance is.

<Wet Performance>

By using the above test car, lateral acceleration (lateral G) of the front wheels was measured while running on an asphalt road surface having a radius of 100 m and provided with a puddle of 10 mm in depth and 20 m in length. The results are average lateral G at a speed of 55 to 80 km/h and indicated by an index based on the value of the Reference 1 being 100, wherein the larger the numerical value, the better the wet performance is.

<Anti-Wear Performance>

Amount of wear of the oblique land regions after driving the test car for a certain distance on an asphalt road surface was measured. The results are indicated by an index based on the Reference 1 being 100, wherein the smaller the numerical value, the better the anti-wear performance is. The test results are shown in Table 1.

TABLE 1

| | Ref. 1 | Ref. 2 | Ex. 1 | Ex. 2 | Ex. 3 | Ex. 4 | Ex. 5 | Ex. 6 | Ex. 7 |
|---|---|---|---|---|---|---|---|---|---|
| FIG. showing Tread pattern | FIG. 4 | FIG. 5 | FIG. 1 | FIG. 1 | FIG. 1 | FIG. 1 | FIG. 1 | FIG. 1 | FIG. 1 |
| Distance L1 between Tire equator and Crown main groove/Tread width TW | 0.14 | 0.14 | 0.14 | 0.10 | 0.13 | 0.17 | 0.20 | 0.14 | 0.14 |
| Angle $\theta 2$ between Crown main groove and Oblique main grooves [degree] | 45 | 45 | 45 | 45 | 45 | 45 | 45 | 30 | 40 |
| Angle $\theta 4$ of Inner oblique sub-groove [degree] | — | — | 80 | 80 | 80 | 80 | 80 | 80 | 80 |
| Angle $\theta 5$ of Outer oblique sub-groove [degree] | — | 70 | 70 | 70 | 70 | 70 | 70 | 70 | 70 |
| On-snow performance [index] | 100 | 104 | 110 | 108 | 110 | 110 | 109 | 108 | 110 |
| Wet performance [index] | 100 | 103 | 105 | 106 | 106 | 104 | 104 | 103 | 104 |
| Anti-wear performance [index] | 100 | 102 | 102 | 104 | 103 | 102 | 102 | 102 | 102 |

| | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| FIG. showing Tread pattern | FIG. 1 | FIG. 1 | FIG. 1 | FIG. 1 | FIG. 1 | FIG. 1 | FIG. 1 | FIG. 1 | FIG. 1 | FIG. 1 |
| Distance L1 between Tire equator and Crown main groove/Tread width TW | 0.14 | 0.14 | 0.14 | 0.14 | 0.14 | 0.14 | 0.14 | 0.14 | 0.14 | 0.14 |
| Angle $\theta 2$ between Crown main groove and Oblique main grooves [degree] | 50 | 60 | 45 | 45 | 45 | 45 | 45 | 45 | 45 | 45 |
| Angle $\theta 4$ of Inner oblique sub-groove [degree] | 80 | 80 | 70 | 75 | 85 | 90 | 80 | 80 | 80 | 80 |
| Angle $\theta 5$ of Outer oblique sub-groove [degree] | 70 | 70 | 70 | 70 | 70 | 70 | 60 | 65 | 75 | 80 |
| On-snow performance [index] | 110 | 109 | 110 | 110 | 109 | 109 | 109 | 110 | 109 | 109 |
| Wet performance [index] | 105 | 106 | 104 | 104 | 105 | 106 | 106 | 105 | 105 | 104 |
| Anti-wear performance [index] | 104 | 105 | 104 | 102 | 102 | 104 | 104 | 102 | 102 | 103 |

From the test results, it was confirmed that the on-snow performance and the wet performance of the tires as the Examples were improved. Further, it was confirmed that the tires as the Examples maintained the anti-wear performance.

The invention claimed is:

1. A tire comprising: a tread portion; comprising a first tread portion defined between a tire equator and a first tread edge positioned on one side in a tire axial direction; the first tread portion being provided with a crown main groove extending continuously and straight in a tire circumferential direction spaced apart from the tire equator and a plurality of oblique main grooves extending obliquely from the first tread edge toward the tire equator to cross and pass the crown main groove to form a plurality of oblique land regions each defined between a pair of oblique main grooves adjacent in the tire circumferential direction; at least one of the oblique land regions being provided with an inner oblique sub-groove extending from one of the oblique main grooves and terminating within the at least one of the oblique land regions on an outer side of the crown main groove in a tire axial direction and an outer oblique sub-groove disposed on the outer side of the inner oblique sub-groove in the tire axial direction and connecting between a pair of the oblique main grooves adjacent to both sides of the at least one of the oblique land regions, wherein the inner oblique sub-groove is inclined to an opposite direction to the oblique main grooves; and both groove edges of the crown main groove extending linearly along the tire circumferential direction.

2. The tire according to claim 1, wherein
the outer oblique sub-groove is inclined to the opposite direction to the oblique main grooves.

3. The tire according to claim 1, wherein
the outer oblique sub-groove is inclined with respect to the tire circumferential direction at an angle smaller than the inner oblique sub-groove.

4. The tire according to claim 1, wherein
the oblique main grooves has groove widths larger than that of the crown main groove at least in a region on the outer side of the crown main groove in the tire axial direction.

5. A tire comprising: a tread portion comprising a first tread portion defined between a tire equator and a first tread edge; the first tread portion being provided with a crown main groove extending continuously and straight in a tire circumferential direction spaced apart from the tire equator and a plurality of oblique main grooves extending obliquely from the first tread edge toward the tire equator to cross the crown main groove to form a plurality of oblique land regions each defined between a pair of oblique main grooves adjacent in the tire circumferential direction; at least one of the oblique land regions being provided with an inner oblique sub-groove extending from one of the oblique main grooves and terminating within the at least one of the oblique land regions on an outer side of the crown main groove in a tire axial direction and an outer oblique sub-groove disposed on the outer side of the inner oblique sub-groove in the tire axial direction and connecting between a pair of the oblique main grooves adjacent to both sides of the at least one of the oblique land regions; and a distance in the tire axial direction between the tire equator and a groove center line of the crown main groove is in a range of from 0.10 to 0.20 times a tread width.

6. The tire according to claim 1, wherein
an angle between the crown main groove and the oblique main grooves is in a range of from 30 to 60 degrees.

7. The tire according to claim 1, wherein
a groove width of the crown main groove is in a range of from 1.5% to 4.5% of a tread width.

8. The tire according to claim 1, wherein
each of the oblique main grooves includes a main body portion extending from the first tread edge to an area between the crown main groove and the tire equator, and an inner portion connected with the main body portion on the side of the tire equator.

9. The tire according to claim 8, wherein
the main body portion extends from the first tread edge toward the tire equator with a continuously decreasing angle with respect to the tire circumferential direction, and
the angle of the main body portion is in a range of from 15 to 75 degrees.

10. The tire according to claim 8, wherein
the main body portion has a groove width gradually decreasing axially inwardly, and
the groove width of the main body portion is in a range of from 2% to 7% of a tread width.

11. The tire according to claim 8, wherein
the inner portion diverges from the main body portion to extend toward the tire equator such that the inner portion is connected on a toe-side in a tire rotational direction of an end of the main body portion with another main body portion.

12. The tire according to claim 8, wherein
the tread portion comprises a second tread portion defined between the tire equator and a second tread edge positioned on the other side in the tire axial direction,
the second tread portion is provided with another set of the oblique main grooves configured line symmetric with the oblique main grooves in the first tread portion with respect to the tire equator except for a disalignment in the tire circumferential direction,
each of the inner portions of the oblique main grooves provided in the first tread portion crosses the tire equator to be connected with one of the oblique main grooves provided in the second tread portion.

13. The tire according to claim 8, wherein
the inner portion extends straight and obliquely to a same side with respect to the tire axial direction as the main body portion, and
an angle of the inner portion with respect to the tire axial direction is in a range of from 10 to 30 degrees.

14. The tire according to claim 1, wherein
an angle of the inner oblique sub-groove with respect to the oblique main groove from which the inner oblique sub-groove extends is in a range of from 70 to 90 degrees.

15. The tire according to claim 1, wherein
a distance in the tire axial direction between the tire equator and an intersection of an extended groove center line of the inner oblique sub-groove and a groove center line of the oblique main groove from which the inner oblique sub-groove extends is in a range of from 0.15 to 0.25 times a tread width.

16. The tire according to claim 1, wherein
a groove width of the inner oblique sub-groove gradually decreases toward a terminating end portion thereof, and
the groove width of the inner oblique sub-groove is in a range of from 1% to 3% of a tread width.

17. The tire according to claim 1, wherein
an angle of the outer oblique sub-groove with respect to the oblique main groove is in a range of from 60 to 80 degrees.

18. The tire according to claim 1, wherein
a distance L3 in the tire axial direction between the tire equator and an intersection of an extended groove center line of one of the outer oblique sub-grooves and the groove center line of one of the oblique main grooves provided on the toe-side thereof is in a range of from 0.20 to 0.30 times a tread width.

19. The tire according to claim 1, wherein
the outer oblique sub-groove extends linearly with a constant groove width, and
the groove width of the outer oblique sub-groove is in a range of from 1% to 3% of a tread width.

* * * * *